(12) United States Patent
Zhang

(10) Patent No.: US 8,720,869 B2
(45) Date of Patent: May 13, 2014

(54) HIGH-SPEED CENTRIFUGAL ATOMIZATION MIXING NET FOR EXHAUST OUTLET PIPE

(76) Inventor: Hongsheng Zhang, Ningbo (CN)

( * ) Notice: Subject to any disclaimer, the term of this patent is extended or adjusted under 35 U.S.C. 154(b) by 569 days.

(21) Appl. No.: 13/115,968

(22) Filed: May 25, 2011

(65) Prior Publication Data
US 2012/0133062 A1    May 31, 2012

(30) Foreign Application Priority Data

Nov. 29, 2010   (CN) ...................... 2010 2 0627749 U

(51) Int. Cl.
*B01F 3/04*   (2006.01)
(52) U.S. Cl.
USPC ................ 261/76; 261/78.2; 261/83; 261/88; 261/89; 261/118
(58) Field of Classification Search
USPC .............. 261/30, 76, 78.2, 83, 84, 85, 88, 89, 261/118
See application file for complete search history.

(56) References Cited

U.S. PATENT DOCUMENTS 3,016,979 A * 1/1962 Schmid .............................. 95/71
4,874,400 A * 10/1989 Jury .................................. 95/38

* cited by examiner

*Primary Examiner* — Robert A Hopkins
(74) *Attorney, Agent, or Firm* — Matthias Scholl P.C.; Matthias Scholl

(57) ABSTRACT

A high-speed centrifugal atomization mixing net for an exhaust outlet pipe, including a spray pipe, a shaft sleeve, an induced air blade, and an atomization net. The spray pipe is capable of rotating. The shaft sleeve is fixedly disposed on the spray pipe. The induced air blade is disposed on the front of the shaft sleeve. The atomization net is disposed at the back of the shaft sleeve. A spray hole opposite to the shaft sleeve is disposed on a side wall of the spray pipe. Multiple inclined spray grooves are disposed on side wall of the shaft sleeve. An end of the induced air blade is bent. The bending direction of the induced air blade is the same as an inclination direction of the induced air blade. The bent part of the induced air blade is connected to an outer edge of the atomization net whereby forming a stop plate.

6 Claims, 2 Drawing Sheets

HIGH-SPEED CENTRIFUGAL ATOMIZATION MIXING NET FOR EXHAUST OUTLET PIPE

CROSS-REFERENCE TO RELATED APPLICATIONS

Pursuant to 35 U.S.C. §119 and the Paris Convention Treaty, this application claims the benefit of Chinese Patent Application No. 201020627749.6 filed on Nov. 29, 2010, the contents of which are incorporated herein by reference.

BACKGROUND OF THE INVENTION

1. Field of the Invention

The invention relates to exhaust purification and processing device, and more particularly to a high-speed centrifugal atomization mixing net for an exhaust outlet pipe.

2. Description of the Related Art

Nowadays, exhaust purification and processing devices are widely used in industries. Conventional exhaust purification and processing device is a high-speed centrifugal atomization blade, comprising a shaft sleeve and multiple inclined blades. The shaft sleeve is connected to a water inlet pipe, and the blades are disposed on the shaft sleeve. A centrifugal water groove is disposed on side wall of the shaft sleeve, and between adjacent blades. An annular stop plate is disposed on a front end of the shaft sleeve, and multiple centrifugal outlet holes are uniformly distributed on the stop plate. A net cover fixed to the blade is disposed on the front of the shaft sleeve, and multiple layers of mesh plates are disposed in the net cover. However, there are several problems with the high-speed centrifugal atomization blade: large part of exhaust residues are tightly attached to inner wall of a pipe, and are directly discharged without being filtered by an atomization net, and therefore exhaust is not adequately contacted with water mist, which greatly affects filtering effect thereof.

SUMMARY OF THE INVENTION

In view of the above-described problem, it is one objective of the invention to provide a high-speed centrifugal atomization mixing net for an exhaust outlet pipe that is capable of addressing the above-mentioned problems.

To achieve the above objectives, in accordance with one embodiment of the invention, provided is a high-speed centrifugal atomization mixing net for an exhaust outlet pipe, comprising a spray pipe, a shaft sleeve, an induced air blade, and an atomization net, the spray pipe is capable of rotating, the shaft sleeve is fixedly disposed on the spray pipe, the induced air blade is disposed on the front of the shaft sleeve, the atomization net is disposed at the back of the shaft sleeve, a spray hole opposite to the shaft sleeve is disposed on side wall of the spray pipe, multiple inclined spray grooves are disposed on side wall of the shaft sleeve, an end of the induced air blade bends, a bending direction of the induced air blade is the same as an inclination direction of the induced air blade, and a bending part of the induced air blade is connected to an outer edge of the atomization net whereby forming a stop plate.

In a class of this embodiment, an atomization cavity bending inwards is disposed on inner wall of the shaft sleeve.

In a class of this embodiment, the atomization cavity is opposite to the spray hole of the spray pipe.

In a class of this embodiment, multiple return air blades are disposed on wall in the vicinity of the atomization net.

In a class of this embodiment, an inclination direction of the return air blade is opposite to that of the induced air blade.

In a class of this embodiment, the atomization net is a multi-layer steel net in the shape of a disk.

Advantages of the invention comprise:

1) the invention is disposed in an exhaust outlet pipe, water sprayed from the spray hole of the spray pipe forms initial atomization in the atomization cavity, and is sprayed out from the multiple inclined spray grooves, then sprayed water mist is further divided into smaller particles along outer wall of the shaft sleeve under the action of high speed air induction, and form fog wall on a cross section of the pipe, which enables poisonous materials and dusts in the exhaust to be quickly mixed in water mist, and reduces heat of the exhaust;

2) the invention is capable of blocking air flow targeting wall of the pipe, and the return air blade on side wall of the atomization net is capable of pulling back air flow tightly attached to inner wall of the pipe, and inducing exhaust in the atomization net for further filtering, which solves a problem that the exhaust is tightly attached to the inner wall of the pipe and directly discharged without passing the atomization net, and enables the exhaust to be adequately contacted with the water mist, whereby facilitating perfect purification of the exhaust.

DETAILED DESCRIPTION OF THE EMBODIMENTS

Figure 1:
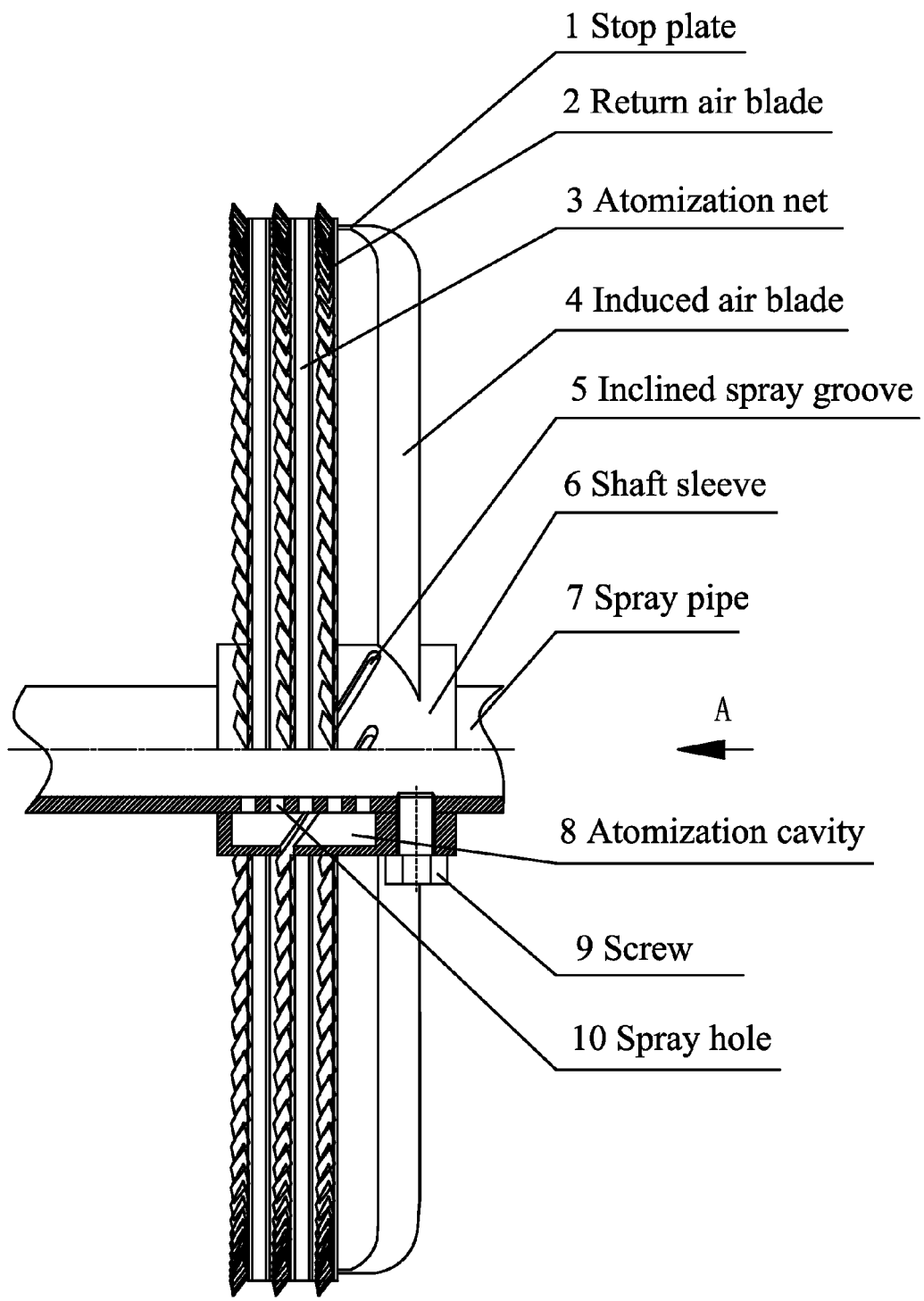
FIG. 1 is a schematic view of a high-speed centrifugal atomization mixing net for an exhaust outlet pipe of an exemplary embodiment of the invention.
Figure 2:
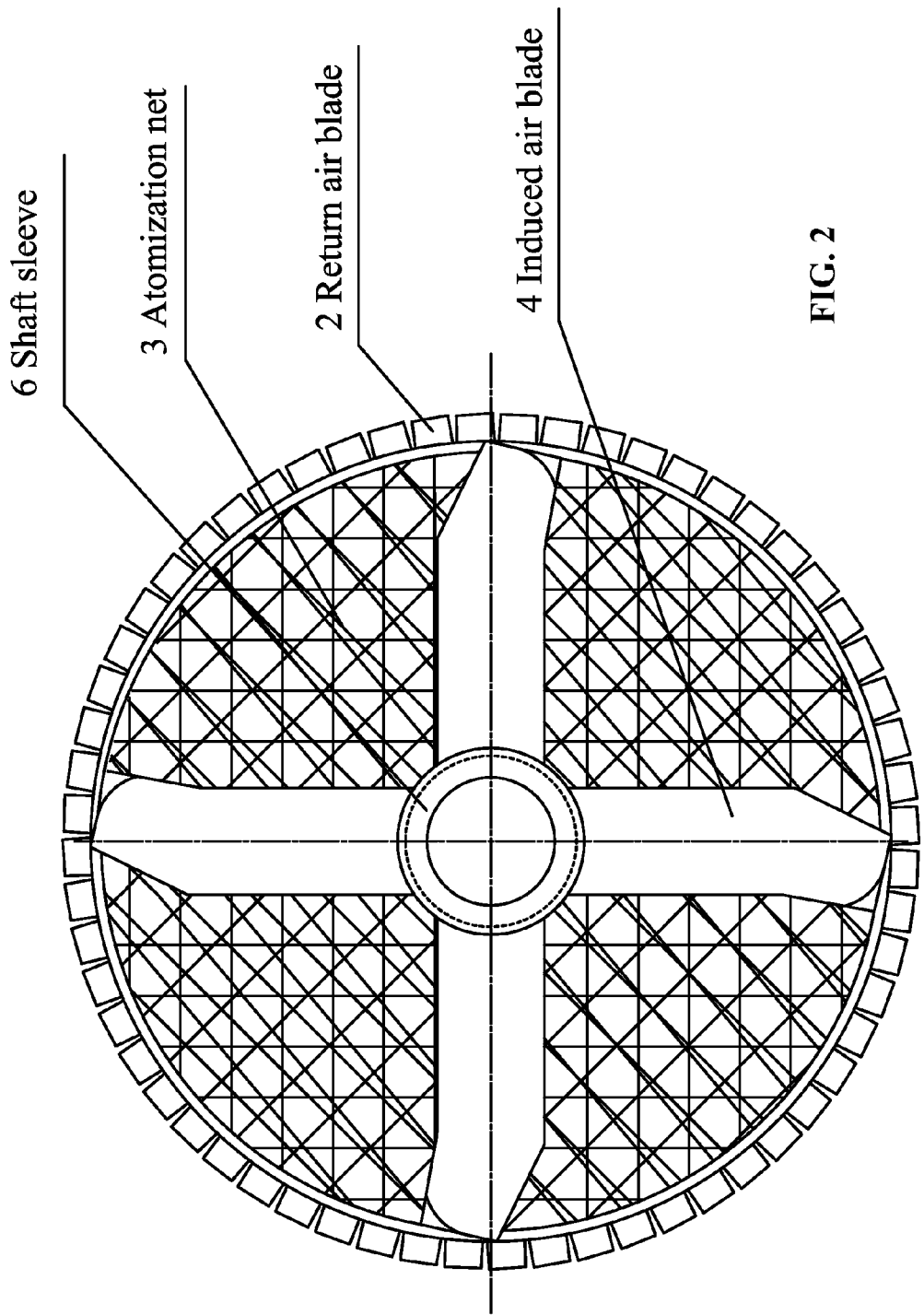
FIG. 2 is a partially enlarged view of FIG. 1 along an A-A line.

As shown in FIGS. 1 and 2, a high-speed centrifugal atomization mixing net for an exhaust outlet pipe of the invention comprises a spray pipe 7, a shaft sleeve 6, an induced air blade 4, and an atomization net 3. The spray pipe 7 is capable of rotating, the shaft sleeve 6 is fixedly disposed on the spray pipe 7, the induced air blade 4 is disposed on the front of the shaft sleeve 6, and the atomization net 3 is disposed at the back of the shaft sleeve 6.

The spray pipe 7 is driven by a motor and rotates at high speed, and the shaft sleeve 6 is connected to the spray pipe 7 via a screw 9. Therefore, the shaft sleeve 6, the induced air blade 4, and the atomization net 3 synchronously rotate at high speed along with the spray pipe 7.

A spray hole 10 opposite to the shaft sleeve 6 is disposed on side wall of the spray pipe 7, an atomization cavity 8 bending inwards is disposed on inner wall of the shaft sleeve 6, and the atomization cavity 8 is opposite to the spray hole 10 of the spray pipe 7.

Multiple inclined spray grooves 5 are disposed on side wall of the shaft sleeve 6. Water sprayed from the spray hole 10 of the spray pipe 7 is repeatedly knocked in the atomization cavity 8, then sprayed out from the spray grooves 5, and contacted with the atomization net 3 rotating at high speed along outer wall of the shaft sleeve 6 whereby forming high-speed centrifugal mixing-type fog wall. The induced air blade 4 is disposed on a front end of the shaft sleeve 6. Rotation of the induced air blade 4 speeds up flowing of exhaust and water mist sprayed from the spray groove 5 after initial atomization.

The atomization net 3 is a multi-layer steel net in the shape of a disk, and disposed at the back of the induced air blade 4.

The atomization net 3 rotating at high speed divides sprayed water mist divided into smaller particles, and thus forming fog wall on a cross section of the pipe. As the exhaust passes the fog wall rotating at high speed, poisonous materials and dusts in the exhaust are quickly mixed in water mist, and heat of the exhaust is reduced.

An end of the induced air blade 4 bends, a bending direction of the induced air blade 4 is the same as an inclination direction of the induced air blade 4, and a bending part of the induced air blade 4 is connected to an outer edge of the atomization net 3 whereby forming a stop plate 1.

The stop plate 1 is capable of blocking air flow targeting wall of the pipe, and inducing exhaust in the atomization net for further filtering, which prevents air flow from being directly discharged without passing the fog wall.

Multiple return air blades 2 are disposed on wall in the vicinity of the atomization net 3, and an inclination direction of the return air blade 2 is opposite to that of the induced air blade 4 The return air blade 2 is capable of pulling back part of air flow tightly attached to the inner wall of the pipe, and enabling the exhaust to be adequately contacted with the fog wall formed by the atomization net 3, which ensures perfect purification of the exhaust.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A high-speed centrifugal atomization mixing net for an exhaust outlet pipe, comprising
a spray pipe (7);
a shaft sleeve (6);
an induced air blade (4); and
an atomization net (3);
wherein
said spray pipe (7) is capable of rotating;
said shaft sleeve (6) is fixedly disposed on said spray pipe (7);
said induced air blade (4) is disposed on the front of said shaft sleeve (6);
said atomization net (3) is disposed at the back of said shaft sleeve (6);
a spray hole (10) opposite to said shaft sleeve (6) is disposed on side wall of said spray pipe (7);
multiple inclined spray grooves (5) are disposed on side wall of said shaft sleeve (6);
an end of said induced air blade (4) bends;
a bending direction of said induced air blade (4) is the same as an inclination direction of said induced air blade (4); and
a bending part of said induced air blade (4) is connected to an outer edge of said atomization net (3) whereby forming a stop plate (1).

2. The high-speed centrifugal atomization mixing net of claim 1, wherein an atomization cavity (8) bending inwards is disposed on inner wall of said shaft sleeve (6).

3. The high-speed centrifugal atomization mixing net of claim 2, wherein said atomization cavity (8) is opposite to said spray hole (10) of said spray pipe (7).

4. The high-speed centrifugal atomization mixing net of claim 1, wherein multiple return air blades (2) are disposed on wall in the vicinity of said atomization net (3).

5. The high-speed centrifugal atomization mixing net of claim 4, wherein an inclination direction of said return air blade (2) is opposite to that of said induced air blade (4).

6. The high-speed centrifugal atomization mixing net of claim 4, wherein said atomization net (3) is a multi-layer steel net in the shape of a disk.

* * * * *